(12) United States Patent
Gaebler et al.

(10) Patent No.: US 7,344,139 B2
(45) Date of Patent: Mar. 18, 2008

(54) HYDRAULIC SHAFT SEALING ARRANGEMENT FOR HIGH-TEMPERATURE APPLICATIONS

(75) Inventors: Miklos Gaebler, Potsdam (DE); Stefan Hein, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 11/203,199

(22) Filed: Aug. 15, 2005

(65) Prior Publication Data

US 2006/0033289 A1 Feb. 16, 2006

(30) Foreign Application Priority Data

Aug. 13, 2004 (DE) ................ 10 2004 040 242

(51) Int. Cl.
*F16J 15/40* (2006.01)
(52) U.S. Cl. ................... 277/431; 277/432
(58) Field of Classification Search ........... 277/411, 277/424, 427, 431–432
See application file for complete search history.

(56) References Cited

U.S. PATENT DOCUMENTS

| | | | |
|---|---|---|---|
| 4,157,881 A | 6/1979 | Kasuya | |
| 6,164,658 A * | 12/2000 | Collin | 277/418 |
| 6,516,618 B1 * | 2/2003 | Bock | 60/782 |
| 6,568,688 B1 | 5/2003 | Boeck | |
| 2003/0168815 A1 | 9/2003 | Rensch | |

FOREIGN PATENT DOCUMENTS

| | | |
|---|---|---|
| EP | 1 045 178 A2 | 10/2000 |
| EP | 1 327 802 A2 | 7/2003 |
| GB | 2 125 118 A | 2/1984 |

* cited by examiner

*Primary Examiner*—Vishal Patel
(74) *Attorney, Agent, or Firm*—Timothy J. Klima

(57) ABSTRACT

On a hydraulic shaft sealing arrangement for high-temperature applications, a heat protection ring (21) and an air chamber (22) are arranged before the annulus (8) containing the sealing medium (10) for thermal insulation, while spacers (16, 17) for the generation of a pumping action are provided in the annulus continuously supplied with fresh sealing medium (oil) to accelerate liquid transport. The hazard of coking and oil carbon deposition is thereby minimized. A split design of the annulus with an inserted annular ring also provides for an improved hydraulic shaft sealing arrangement optimized for weight, overall height, manufacture and assembly time.

18 Claims, 1 Drawing Sheet

HYDRAULIC SHAFT SEALING ARRANGEMENT FOR HIGH-TEMPERATURE APPLICATIONS

This application claims priority to German Patent Application DE 10 2004 040 242.6 filed Aug. 13, 2004, the entirety of which is incorporated by reference herein.

BACKGROUND OF THE INVENTION

This invention relates to a hydraulic shaft sealing arrangement for high-temperature applications, more particularly for concentric shafts of a gas turbine engine, to seal the high-pressure shaft bearing chamber located in the low-pressure zone and the low-pressure shaft against the high-pressure zone.

Hydraulic sealing arrangements, as is generally known, are used for contact-free sealing between two concentric, co-rotating shafts. In principle, such sealing arrangements can also be used with only one rotating shaft. The sealing arrangement normally consists of an essentially U-shaped annulus arranged on the inner circumference of the outer shaft which is filled with a fluidic sealing medium, preferably oil, supplied from the lubricating circuit of the respective engine by the effect of centrifugal force. A circumferential sealing fin arranged on the outer circumference of the inner shaft protrudes into the sealing medium in the annulus, thus providing a contact-free seal between the two shafts.

Such hydraulic sealing arrangements have proved good in many applications. In high-temperature applications, specifically the sealing of the bearing chamber for the high-pressure shaft and the low-pressure shaft of a gas turbine engine against the compressor air supplied at a temperature of 400° C., for example, these hydraulic sealing arrangements are problematic in that the oil, which is used as sealing medium and lubricant of the two shaft bearings, is liable to degradation and coking as a result of the high temperatures. In particular, on the side facing the high-temperature area, solid carbonization products will deposit on the inner surface of the annulus, which products may detach during operation and affect the continuous supply of fresh, cool oil into the annulus, the necessary dissipation of heat effected by the continuous oil exchange and, finally, sealing reliability.

Such a hydraulic sealing arrangement is described in Specification EP 1 045 178 A2, for example, in an application to the high-temperature area of a two-shaft gas turbine aircraft engine with concentric high-pressure and low-pressure shafts. The annulus containing the sealing medium into which the sealing fin of the low-pressure shaft protrudes is formed directly from the material of the high-pressure shaft. The considerable overall size and high weight of this design result in the known disadvantages for an aircraft engine. The annulus is continuously supplied with sealing medium, actually oil injected into the bearing chamber for lubrication of the rolling bearings of the high-pressure and the low-pressure shaft. A partial quantity of the sealing medium in the annulus is continuously drawn off either via an opening in the bottom or by means of a scooping plate from the bottom over the upper inner edge of the annulus. Continuous oil exchange prevents the sealing medium from being overheated, thus counteracting coking. Removal of the sealing medium from an annulus area formed into the bottom is, however, disadvantageous in that sealing against the hot high-pressure zone will be affected if the supply of oil and, thus, the amount of sealing medium in the annulus is inadequate. If the heated sealing medium is removed via the outermost edge of the annulus, the relatively hot sealing medium is passed over a considerable distance along the wall of an angular ring inserted into the annulus and the annulus inner wall, allowing oil carbon particles to deposit here as well. Even if the oil is continuously exchanged in the annulus, formation of a carbon layer on the hot inner wall of the annulus filled with sealing medium cannot be excluded.

BRIEF SUMMARY OF THE INVENTION

A broad aspect of the present invention is to provide a hydraulic shaft sealing arrangement which prevents oil carbon formation in the high-temperature area, ensures reliability of sealing at all times, saves space, weight and assembly time and ensures rapid oil exchange.

It is a particular object of the present invention to provide solution to the above problems by a hydraulic shaft sealing arrangement designed in accordance with the features described herein.

The underlying idea of the present invention is a heat protection ring arranged before the annulus containing the sealing medium and at a certain distance from the annulus side faces adjacent to the high-pressure or high-temperature area, this heat protection ring being arranged on the one shaft and ending short of the other shaft while forming a narrow sealing gap. Thus, the annulus with the sealing medium is separated from immediate thermal influence in the high-temperature area by a heat shield and a thermally insulating air chamber/stagnation zone. The heating of the sealing medium and its tendency to coking as a result of the high temperatures and deposition of oil carbon particles at the particularly hot inner wall surfaces of the annulus are considerably reduced. The reduced formation of oil carbon improves the continuity of exchange of the entire sealing medium in the annulus, further minimizing the temperature of the sealing medium and the hazard of coking.

According to another important feature of the present invention, means are provided on the inner walls of the annulus which exert a pumping action on the sealing medium as the annulus rotates and accelerate the transport of the medium through the annulus, i.e. improve the continuous exchange of the sealing medium, thus further reducing its temperature. In particular the combination of measures for thermal protection and improved medium transport or exchange enables the temperature of the sealing medium to be lowered to a level that ensures, in the high-temperature area, perfect sealing of the high-pressure shaft against the low-pressure shaft or the rear bearing chamber adjacent to the high-pressure area and, thus, protection of the respective rolling bearings and the carbon mating ring seal as well as reliable operation of the gas turbine. Furthermore, active cooling of the carbon mating seal ring running face enhances the service life of the carbon mating ring seal used.

According to a further significant feature of the present invention, the annulus for the sealing medium provided on the outer rotating shaft is formed by a first annular disk formed on the shaft and a separate, second annular disk. This facilitates assembly of the shaft and reduces the size and weight in this area. An angular ring is inserted in the annulus in such a manner that the sealing medium near the first, most severely heated annular disk and near the bottom can flow off through an annular duct formed between the bottom and the second annular disk via the inward, free edge of the second annular disk into the bearing chamber. Thus, the hottest, most readily coking sealing medium will be scavenged first, actually such that sealing medium will always be present in the annulus at a level given by the height of the second annular disk, even if the supply of oil is interrupted, and the sealing function is maintained.

In a further development of the present invention, the angular ring is retained at the bottom and at the second annular disk by means of several spacers. These axial and radial spacers, in a special inclined arrangement and design, are the inventive means for the generation of the pumping effect to accelerate exchange of the sealing medium in the annulus of the hydraulic shaft seal.

BRIEF DESCRIPTION OF THE DRAWING

An embodiment of the present invention is more fully described in light of the accompanying drawing. The single FIGURE shows a semi-section of a bearing chamber, hydraulically sealed between the high-pressure and the low-pressure side, for the support of the high-pressure shaft and the low-pressure shaft of a gas turbine engine.

DETAILED DESCRIPTION OF THE INVENTION

Figure 1:
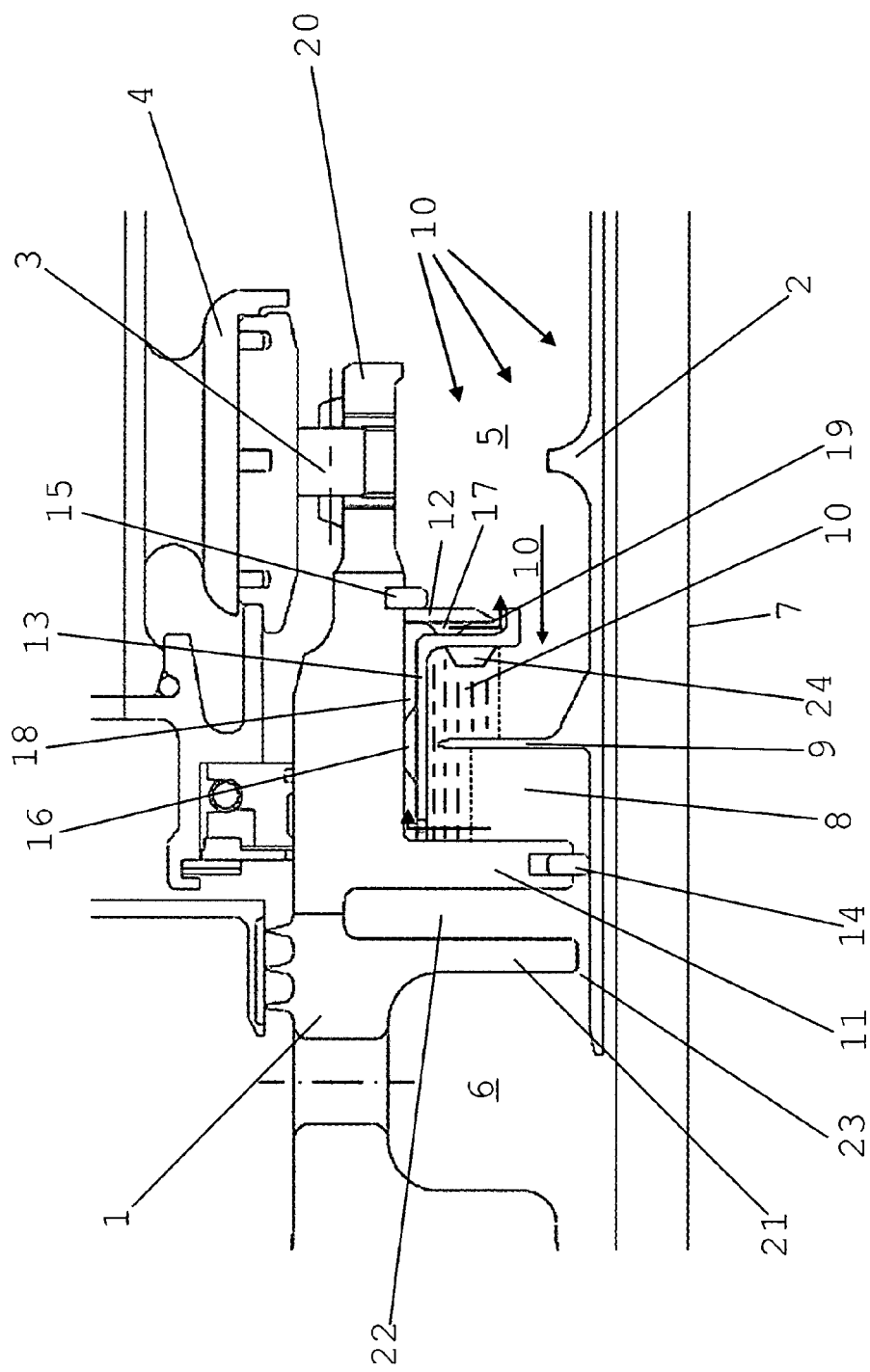

The high-pressure shaft 1 and the low-pressure shaft 2 of a gas turbine engine are concentrically supported in the turbine casing 4 by means of a first rolling bearing 3 for the high-pressure shaft 1 and a second rolling bearing (not shown) for the low-pressure shaft 2. For cooling and lubrication, the bearing chamber 5 so formed is continuously supplied with coolant-lubricant (oil). In order to seal the low-pressure zone in the bearing chamber 5 against the relatively hot high-pressure zone 6 to avoid coking and ignition of the oil, the two, preferably co-rotating shafts, here the high-pressure shaft 1 and the low-pressure shaft 2, are sealed against each other by means of a hydraulic sealing arrangement. The hydraulic sealing arrangement comprises an U-shaped annulus 8 provided on the high-pressure shaft 1 and open to the rotational axis 7 which, as a result of the centrifugal forces effected by the rotation of the high-pressure shaft 1, is filled with coolant-lubricant supplied to the bearing chamber 5 and a circumferential sealing fin 9 on the outer circumference of the low-pressure shaft 2 which protrudes into the annulus 8 and the sealing medium 10 present in the annulus 8 during rotation of the high-pressure shaft 1, thus sealing the low-pressure shaft 2 against the high-pressure shaft 1 or the low-pressure zone in the bearing chamber 5 against the high-pressure zone 6, respectively.

The U-shaped annulus 8 is formed by a first annular disk 11, a second annular disk 12 and an angular ring 13. The first annular disk 11 is integrally formed onto the interior of the high-pressure shaft 1 and is provided, at its free end, with a piston ring 14 which, due to centrifugal forces at higher RPMs, expands within the groove of first annular disk 11 to open a narrow annular gap towards the exterior of the low-pressure shaft 2 as the high-pressure shaft rotates and, due to the elimination of centrifugal forces at turbine standstill, contacts to effect sealing with the low pressure shaft 2 at standstill. The second annular disk 12, which has a significantly larger inner circumference, i.e. is narrower, than the first annular disk 11, is retained on the inner circumferential surface of the high-pressure shaft 1 by means of a circlip 15. Located between the first and the second annular disk 11, 12 is the angular ring 13 whose horizontal leg is firmly positioned with respect to, and/or attached to, the high-pressure shaft 1 by radial spacers 16 and whose vertical leg extending towards the low-pressure shaft 2 locates on the second annular disk 12 by means of axial spacers 17.

The annulus 8 so decoupled from the bearing support 20 on the high-pressure shaft 1 by a separate annular disk has small overall height and low weight. The manufacturing and assembly effort is lower than for known hydraulic sealing arrangements of similar design. The sealing medium 10 (coolant-lubricant, oil) continuously supplied to the annulus 8 during rotation of the high-pressure shaft 1, upon absorbing heat at the first annular disk 11, rapidly flows via the annular duct 18 existing between the angular ring 13 and the high-pressure shaft 1 or the second annular disk 12, respectively, from the annulus 8 back into the bearing chamber 5. The exit opening 19 of the annular duct 18 is spaced such from the inner surface of the high-pressure shaft 1, actually radially inwards above the free edge of the sealing fin 9, that a rapid, continuous exchange of the heated sealing medium 10 in the annulus 8 and, thus, adequate cooling of the latter, in particular on the inner surface of the first annular disk 11 exposed most to the high temperatures, is ensured when coolant-lubricant is continuously supplied to the bearing chamber 5. Conversely, if coolant-lubricant is supplied inadequately, imprecisely dosed to the bearing chamber 5, this arrangement of the exit opening 19 ensures that the sealing medium in the annulus 8 does not fall below a level at which the sealing efficiency of the hydraulic sealing arrangement is affected, always maintaining the seal between the high-pressure zone 6 and the bearing chamber 5 or between the high-pressure and the low-pressure shaft, respectively. Rapid, continuous exchange of the coolant-lubricant, i.e. the sealing medium in the annulus 8, is supported by the angular arrangement and the special design of the radial and axial spacers 16, 17 in that they exert a pumping action on the sealing medium in the annulus 8. Active oil circulation via the annulus 8 minimizes the probability of occurrence of zones of hot oil resulting in coking and local carbon deposits and, consequently, impairment of the oil supply.

The radial spacers 16 can be axially aligned, aligned at an angle with respect to the axis 7, or have a compound or curved configuration. They can be attached to either the annular ring 13 or the bearing support 20. The axial spacers 17 can be generally radially aligned, aligned at angles with respect to radial lines, or have a compound or curved configuration. They can be attached to either the annular ring 13 or the second annular disk 12. The number, positioning and shape of the spacers can be altered as desired for the specific application. Rotation of the high-pressure shaft 1 forces the sealing medium 10 through the inlet hole in the annular ring 13 and in the axial direction between the bearing support 20 and the annular ring 13 towards the low pressure side. The axial spacers 17 act to force a circumferential/tangential exit velocity of the cooling medium 10 to be equal to a circumferential/tangential velocity of the high pressure shaft at the exit radius. The axial spacers 17 also de-swirl the flow of the cooling medium 10 leading to a reduced cooling medium spray generation at the cooling medium exit 19 into the low pressure cavity.

In addition to the above measures for active oil circulation to prevent local overheating as well as coking and carbon deposition, a thermal protection device is arranged on the high-pressure side 6 before the hydraulic sealing arrangement for the bearing chamber 5. In the present embodiment, this thermal protection device is implemented by means of a heat protection ring 21 formed on the high-pressure shaft 1 and an air stagnation chamber 22 formed between the heat protection ring 21 and the first annular disk 11. The positioning of the heat protection ring 21 with respect to the low pressure shaft 2 forms a sealing (clearance) gap 23 therebetween, the size of which can be altered as desired to provide the specific characteristics desired. Thus, the annulus 8 of the hydraulic sealing arrangement and, consequently, the circulating oil are heated to a lesser extent, further minimizing the hazard of coking and carbon deposits and providing better protection of the rolling bearings of the high-pressure and low pressure shaft as the quality of the lubricant remains unaffected. Protrusions 24 are formed on the angular ring 13 to swirl the sealing medium and further improve the transport of sealing medium in the annulus 8.

LIST OF REFERENCE NUMERALS

1 High-pressure shaft
2 Low-pressure shaft
3 Rolling bearing of 1
4 Turbine casing
5 Bearing chamber (low-pressure zone)
6 High-pressure zone (high-temperature area)
7 Rotational axis of 1, 2
8 U-shaped annulus
9 Sealing fin
10 Sealing medium
11 First (integral) annular disk of 8
12 Second (separate) annular disk of 8
13 Angular ring of 8
14 Piston ring
15 Circlip
16 Radial spacer
17 Axial spacer
18 Annular duct (drainage duct)
19 Exit opening of 18
20 Bearing support of 1
21 Heat protection ring
22 Air stagnation chamber
23 Sealing gap
24 Protrusions, swirling means

What is claimed is:

1. A hydraulic shaft sealing arrangement for high-temperature applications between concentric high pressure and low pressure shafts of a gas turbine engine, to seal a high-pressure shaft bearing chamber located in a low-pressure zone against a high-pressure zone, comprising:
   an essentially U-shaped annulus arranged circumferentially on an inner circumference of the high-pressure shaft and containing a continuously exchanged sealing medium held within it by centrifugal forces, the annulus having, on an upstream side, a first annular disk extending radially inward to hold the sealing medium in the annulus,
   an annular sealing fin protruding into the sealing medium, and
   an annular heat protection ring positioned in the high pressure zone a certain distance upstream from the annulus, the heat protection ring extending radially inward toward the low-pressure shaft beyond a radially inner level of the centrifugally held sealing medium and ending immediately adjacent the low pressure shaft to create a minimal circumferential gap between the heat protection ring and the low-pressure shaft, the heat protection ring thereby acting as a heat shield between the high pressure gas and the annulus and also thereby forming a thermally insulating air chamber between the heat protection ring and the annulus, the air chamber being axially disposed between an axially outer surface of the first annular disk and an axially inner surface of the heat protection ring, the air chamber also extending radially outward beyond the sealing medium in the U-shaped annulus such that the entire radial depth of the sealing medium in the U-shaped annulus is protected from the high pressure zone by the thermally insulating air chamber.

2. A hydraulic shaft sealing arrangement in accordance with claim 1, wherein the heat protection ring is integral with the high-pressure shaft.

3. A hydraulic shaft sealing arrangement in accordance with claim 1, wherein the U-shaped annulus comprises the first annular disk formed on the high-pressure shaft near the heat protection ring, a second annular disk decoupled from the high-pressure shaft and a circumferential angular ring fixed remotely of the inner circumference of the high-pressure shaft and the second annular disk, and further comprising several spacers, whose design and orientation exert a pumping action on the heated sealing medium to be removed, the spacers being arranged in an annular duct formed between the angular ring, the inner circumference of the high pressure shaft and the second annular disk and serving to remove the heated sealing medium at an exit opening located at a level of a free edge of the second annular disk.

4. A hydraulic shaft sealing arrangement in accordance with claim 3, wherein the separate, second annular disk is fitted immediately to the bearing support of the high-pressure shaft by a circlip.

5. A hydraulic shaft sealing arrangement in accordance with claim 3, wherein a piston ring is arranged at a free edge of the first annular disk which opens a narrow annular gap as the high-pressure shaft rotates.

6. A hydraulic shaft sealing arrangement in accordance with claim 3, wherein protrusions are provided on a side of the angular ring facing towards the annulus for swirling the sealing medium and for better transporting the sealing medium in the annulus.

7. A hydraulic shaft sealing arrangement in accordance with claim 1, wherein the essentially U-shaped annulus includes an annular ring-shaped insert spaced radially inwardly from the essentially U-shaped annulus by a radial spacer to create an annular duct between the ring-shaped insert and the essentially U-shaped annulus, the annular duct having an inlet opening and an exit opening, a flow of the sealing medium through the annular duct being controlled by at least one of the inlet opening and the exit opening.

8. A hydraulic shaft sealing arrangement in accordance with claim 2, wherein the U-shaped annulus comprises a first annular disk formed on the high-pressure shaft near the heat protection ring, a second annular disk decoupled from the high-pressure shaft and a circumferential angular ring fixed remotely of the inner circumference of the high-pressure shaft and the second annular disk, and further comprising several spacers, whose design and orientation exert a pumping action on the heated sealing medium to be removed, the spacers being arranged in an annular duct formed between the angular ring, the inner circumference of the high pressure shaft and the second annular disk and serving to remove the heated sealing medium at an exit opening located at a level of a free edge of the second annular disk.

9. A hydraulic shaft sealing arrangement in accordance with claim 8, wherein the separate, second annular disk is fitted immediately to the bearing support of the high-pressure shaft by a circlip.

10. A hydraulic shaft sealing arrangement in accordance with claim 9, wherein a piston ring is arranged at a free edge of the first annular disk which opens a narrow annular gap as the high-pressure shaft rotates.

11. A hydraulic shaft sealing arrangement in accordance with claim 10, wherein protrusions are provided on a side of the angular ring facing towards the annulus for swirling the sealing medium and for better transporting the sealing medium in the annulus.

12. A hydraulic shaft sealing arrangement for high-temperature applications between concentric high pressure and low pressure shafts of a gas turbine engine, to seal a high-pressure shaft bearing chamber located in a low-pressure zone against a high-pressure zone, comprising:

an essentially U-shaped annulus arranged circumferentially on an inner circumference of the high-pressure shaft and containing a continuously exchanged sealing medium held within it by centrifugal forces, an annular sealing fin protruding into the sealing medium, a heat protection ring positioned in the high pressure zone a certain distance from the annulus, the heat protection ring acting as a heat shield and forming a thermally insulating air chamber between the heat protection ring and the annulus, with a sealing gap remaining between the heat protection ring and the low-pressure shaft, and wherein the U-shaped annulus comprises a first annular disk formed on the high-pressure shaft near the heat protection ring, a second annular disk decoupled from the high-pressure shaft and a circumferential angular ring fixed remotely of the inner circumference of the high-pressure shaft and the second annular disk, and further comprising several spacers, whose design and orientation exert a pumping action on the heated sealing medium to be removed, the spacers being arranged in an annular duct formed between the angular ring, the inner circumference of the high pressure shaft and the second annular disk and serving to remove the heated sealing medium at an exit opening located at a level of a free edge of the second annular disk.

13. A hydraulic shaft sealing arrangement in accordance with claim 12, wherein the heat protection ring is integral with the high-pressure shaft.

14. A hydraulic shaft sealing arrangement in accordance with claim 13, wherein the separate, second annular disk is fitted immediately to the bearing support of the high-pressure shaft by a circlip.

15. A hydraulic shaft sealing arrangement in accordance with claim 14, wherein a piston ring is arranged at a free edge of the first annular disk which opens a narrow annular gap as the high-pressure shaft rotates.

16. A hydraulic shaft sealing arrangement in accordance with claim 15, wherein protrusions are provided on a side of the angular ring facing towards the annulus for swirling the sealing medium and for better transporting the sealing medium in the annulus.

17. A hydraulic shaft sealing arrangement in accordance with claim 13, wherein a piston ring is arranged at a free edge of the first annular disk which opens a narrow annular gap as the high-pressure shaft rotates.

18. A hydraulic shaft sealing arrangement in accordance with claim 13, wherein protrusions are provided on a side of the angular ring facing towards the annulus for swirling the sealing medium and for better transporting the sealing medium in the annulus.

* * * * *